(12) United States Patent
Noda et al.

(10) Patent No.: US 10,116,175 B2
(45) Date of Patent: Oct. 30, 2018

(54) ROTARY ELECTRIC MACHINE AND STATOR OF ROTARY ELECTRIC MACHINE

(71) Applicant: TOYOTA JIDOSHA KABUSHIKI KAISHA, Toyota-shi, Aichi-ken (JP)

(72) Inventors: Ken Noda, Nagoya (JP); Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 240 days.

(21) Appl. No.: 15/265,147

(22) Filed: Sep. 14, 2016

(65) Prior Publication Data

US 2017/0085139 A1     Mar. 23, 2017

(30) Foreign Application Priority Data

Sep. 17, 2015  (JP) .................................. 2015-184086

(51) Int. Cl.
*H02K 1/18*  (2006.01)
*H02K 21/16*  (2006.01)
*H02K 1/14*  (2006.01)
*H02K 1/16*  (2006.01)

(52) U.S. Cl.
CPC ............. *H02K 1/185* (2013.01); *H02K 1/146* (2013.01); *H02K 1/16* (2013.01); *H02K 1/18* (2013.01); *H02K 21/16* (2013.01); *H02K 2201/09* (2013.01); *H02K 2213/03* (2013.01)

(58) Field of Classification Search
CPC .......... H02K 1/18; H02K 1/185; H02K 1/187; H02K 2201/09
See application file for complete search history.

(56) References Cited

FOREIGN PATENT DOCUMENTS

| JP | 2007-236067 A | 9/2007 |
|---|---|---|
| JP | 2013-135543 A | 7/2013 |

*Primary Examiner* — Ramon M Barrera
(74) *Attorney, Agent, or Firm* — Sughrue Mion, PLLC (57) ABSTRACT

A stator and a rotary electric machine include a stator core including a plurality of stacked annular electromagnetic steel plates with coupling portions. The coupling portions are arranged with a pitch of an integral multiple of a central angle. The central angle is defined as an angle between two adjacent magnetic poles of the same polarity relative to a rotational center of the rotor. When a number of the coupling portions is an odd number, fixing portions are arranged with the same pitch as the pitch of the coupling portions, or with a pitch corresponding to a divisor of the pitch of the coupling portions. When a number of the coupling portions is an even number, the fixing portions are arranged with a pitch corresponding to a divisor of the pitch of the coupling portions, or a divisor of 180°.

16 Claims, 3 Drawing Sheets

ROTARY ELECTRIC MACHINE AND STATOR OF ROTARY ELECTRIC MACHINE

CROSS-REFERENCE TO RELATED APPLICATIONS

This application claims priority to Japanese Patent Application No. 2015-184086, filed on Sep. 17, 2015 in the Japanese Patent Office, the disclosure of which is incorporated herein by reference in its entirety.

BACKGROUND

1. Field

The present disclosure relates to a rotary electric machine and a stator of a rotary electric machine.

2. Description of Related Art

In Japanese Patent Application Publication No. 2007-236067, it is described that conventionally, in order to reduce an eddy current loss generated in a stator core, bundling portions of electromagnetic steel plates configuring the stator core are arranged with equal intervals in a circumferential direction of the stator core such that a central angle defined by each two adjacent bundling portions becomes an integral multiple of a central angle defined by a double pole pitch of a rotor in combination with a stator.

In a stator of which the stator core is formed by stacking annular electromagnetic steel plates in an axial direction, a stacking thickness of the stator core is set to be uniform in the circumferential direction so as to secure a geometrical tolerance (straightness, squareness, etc.) of the stator core; and for this purpose, the annular electromagnetic steel plates might be stacked while being rotated relative to one another in the circumferential direction. This is called rotational build-up.

In some cases, each of the annular electromagnetic steel plates has fixing-portion margins that protrude radially outward on the outer circumferential portion of the plate, and the fixing-portion margins are stacked in the axial direction, thereby forming fixing portions on an outer circumferential surface of the stator core. The stator including such a stator core is fasteningly fixed to a case that houses a rotary electric machine therein by inserting fastening members such as bolts through through-holes formed in the fixing portions.

In a stator fixed to a case via fixing portions in the above manner, it is necessary to consider positions of the fixing portions in a stator core, otherwise, in the configuration described in JP 2007-236067 A, it is impossible to reduce an eddy current loss, and to secure a geometrical tolerance by rotationally building up annular electromagnetic steel plates.

SUMMARY

The present disclosure provides a stator of a rotary electric machine capable of reducing an eddy current loss as well as securing a geometrical tolerance by rotational build-up.

A stator of a rotary electric machine according to one aspect of the present disclosure includes: a stator core formed by stacking annular electromagnetic steel plates; and a coil. The rotary electric machine includes a rotor, and the rotor includes magnetic poles. The annular electromagnetic steel plates are coupled with one another by coupling portions arranged with equal pitches in a circumferential direction. Each of the coupling portions is arranged with a pitch of an integral multiple of a central angle. The central angle is an angle defined by two circumferentially adjacent magnetic poles of the same pole among the magnetic poles relative to a rotor rotational center. The stator core includes fixing portions projecting radially outward from an outer circumferential surface of the stator core. Each of the fixing portions includes a through-hole extending therethrough in an axial direction, and the fixing portions are arranged with equal pitches in the circumferential direction. A number of the coupling portions is an odd number, and each of the fixing portions is arranged with the same pitch as the pitch of each of the coupling portions, or with a pitch corresponding to a divisor of the pitch of each of the coupling portions relative to the rotor rotational center. The coil is wound around teeth of the stator core.

According to the stator of the rotary electric machine of the present disclosure, the electromagnetic steel plates are coupled by the coupling portions formed with the pitches, each corresponding to an integral multiple of the central angle by a double pole pitch of the rotor, thereby allowing magnetic distributions among the coupling portions in the stator to be the same regardless of the rotor rotational position; consequently, it is possible to hinder the eddy current from flowing through the stacked electromagnetic steel plates via the coupling portions, thus suppressing generation of the eddy current loss. If the annular electromagnetic steel plates are rotationally built-up so as to configure the stator core, positions of the coupling portions are aligned in the axial direction, and positions of the fixing portions of the stator core are also aligned in the axial direction through the electromagnetic steel plates. Accordingly, it is possible to secure the geometrical tolerance of the stator core by rotational build-up of the electromagnetic steel plates.

A stator of a rotary electric machine according to another aspect of the present disclosure includes: a stator core formed by stacking annular electromagnetic steel plates; and a coil. The rotary electric machine includes a rotor, and the rotor includes magnetic poles. The annular electromagnetic steel plates are coupled with one another by coupling portions arranged with equal pitches in a circumferential direction. Each of the coupling portions is arranged with a pitch of an integral multiple of a central angle. The central angle is an angle defined by two circumferentially adjacent magnetic poles of the same pole among magnetic poles relative to a rotor rotational center. The stator core includes fixing portions projecting radially outward from an outer circumferential surface of the stator core. Each of the fixing portions includes a through-hole extending therethrough in an axial direction, and the fixing portions are arranged with equal pitches in the circumferential direction. A number of the coupling portions is an even number. Each of the fixing portions is arranged with a pitch corresponding to a divisor of a pitch of each of the coupling portions relative to the rotor rotational center, or a divisor of 180°. The coil is wound around teeth of the stator core.

According to the stator of the rotary electric machine of the present disclosure, the electromagnetic steel plates are coupled by the coupling portions formed with the pitches, each corresponding to an integral multiple of the central angle by a double pole pitch of the rotor, thereby allowing magnetic distributions among the coupling portions in the stator to be the same regardless of the rotor rotational position; consequently, it is possible to hinder the eddy current from flowing through the stacked electromagnetic steel plates via the coupling portions, thus suppressing generation of the eddy current loss. If the annular electromagnetic steel plates are rotationally built-up so as to configure the stator core, positions of the coupling portions are aligned in the axial direction, and positions of the fixing portions of the stator core are also aligned in the axial direction through the electromagnetic steel plates. Accordingly, it is possible to secure the geometrical tolerance of the stator core by rotational build-up of the electromagnetic steel plates.

In the stator of the rotary electric machine according to the present disclosure, the coupling portions may be arranged at positions displaced from the fixing portions in the circumferential direction.

A rotary electric machine according to one aspect of the present disclosure includes: a rotor; and a stator. The rotor includes magnetic poles. The stator includes: a stator core formed by stacking annular electromagnetic steel plates; and a coil. The electromagnetic steel plates are coupled with one another by coupling portions arranged with equal pitches in a circumferential direction. Each of the coupling portions is arranged with a pitch of an integral multiple of a central angle. The central angle is an angle defined by two circumferentially adjacent magnetic poles of the same pole among the magnetic poles relative to a rotor rotational center. The stator core includes fixing portions projecting radially outward from an outer circumferential surface of the stator core. Each of the fixing portions includes a through-hole extending therethrough in an axial direction, and the fixing portions are arranged with equal pitches in the circumferential direction. A number of the coupling portions is an odd number, and each of the fixing portions is arranged with the same pitch as the pitch of each of the coupling portions, or with a pitch corresponding to a divisor of the pitch of each of the coupling portions relative to the rotor rotational center. The coil is wound around teeth of the stator core.

According to the stator of the rotary electric machine of the present disclosure, the electromagnetic steel plates are coupled by the coupling portions formed with the pitches, each corresponding to an integral multiple of the central angle by a double pole pitch of the rotor, thereby allowing magnetic distributions among the coupling portions in the stator to be the same regardless of the rotor rotational position; consequently, it is possible to hinder the eddy current from flowing through the stacked electromagnetic steel plates via the coupling portions, thus suppressing generation of the eddy current loss. If the annular electromagnetic steel plates are rotationally built-up so as to configure the stator core, positions of the coupling portions are aligned in the axial direction, and positions of the fixing portions of the stator core are also aligned in the axial direction through the electromagnetic steel plates. Accordingly, it is possible to secure the geometrical tolerance of the stator core by rotational build-up of the electromagnetic steel plates.

A rotary electric machine according to another aspect of the present disclosure includes: a rotor; and a stator. The rotor includes magnetic poles. The rotor includes magnetic poles. The stator includes: a stator core formed by stacking annular electromagnetic steel plates; and a coil. The electromagnetic steel plates are coupled with one another by coupling portions arranged with equal pitches in a circumferential direction. Each of the coupling portions is arranged with a pitch of an integral multiple of a central angle. The central angle is an angle defined by two circumferentially adjacent magnetic poles of the same pole among the magnetic poles relative to a rotor rotational center. The stator core includes fixing portions projecting radially outward from an outer circumferential surface of the stator core. Each of the fixing portions includes a through-hole extending therethrough in an axial direction, and the fixing portions are arranged with equal pitches in the circumferential direction. A number of the coupling portions is an even number. Each of the fixing portions is arranged with a pitch corresponding to a divisor of the pitch of each of the coupling portions relative to the rotor rotational center, or a divisor of 180°. The coil is wound around teeth of the stator core.

According to the stator of the rotary electric machine of the present disclosure, the electromagnetic steel plates are coupled by the coupling portions formed with the pitches, each corresponding to an integral multiple of the central angle by a double pole pitch of the rotor, thereby allowing magnetic distributions among the coupling portions in the stator to be the same regardless of the rotor rotational position; consequently, it is possible to hinder the eddy current from flowing through the stacked electromagnetic steel plates via the coupling portions, thus suppressing generation of the eddy current loss. If the annular electromagnetic steel plates are rotationally built-up so as to configure the stator core, positions of the coupling portions are aligned in the axial direction, and positions of the fixing portions of the stator core are also aligned in the axial direction through the electromagnetic steel plates. Accordingly, it is possible to secure the geometrical tolerance of the stator core by rotational build-up of the electromagnetic steel plates.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments according to the present disclosure will be described in details with reference to accompanying drawings, hereinafter. In this description, specific shapes, materials, numerical values, and directions, etc., are merely examples for facilitating understanding of the present disclosure, and they may be appropriately changed depending on applications, purposes, specifications, and others. If several embodiments and variations are included in the flowing description, it is supposed, from the beginning, to appropriately combine and use features thereof.

Figure 1:
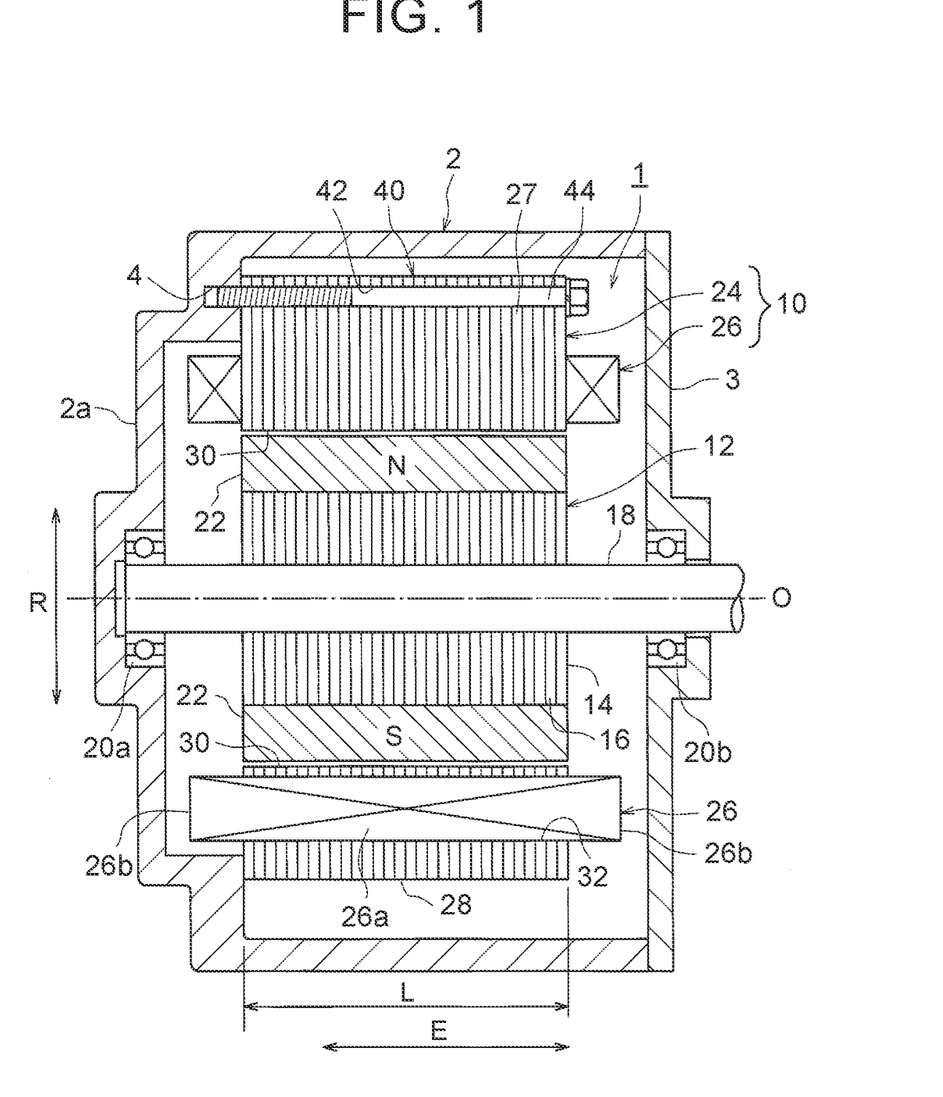
FIG. 1 is a sectional view of a rotary electric machine including a stator of a first embodiment, as viewed along an axial direction of the rotary electric machine.
Figure 2:
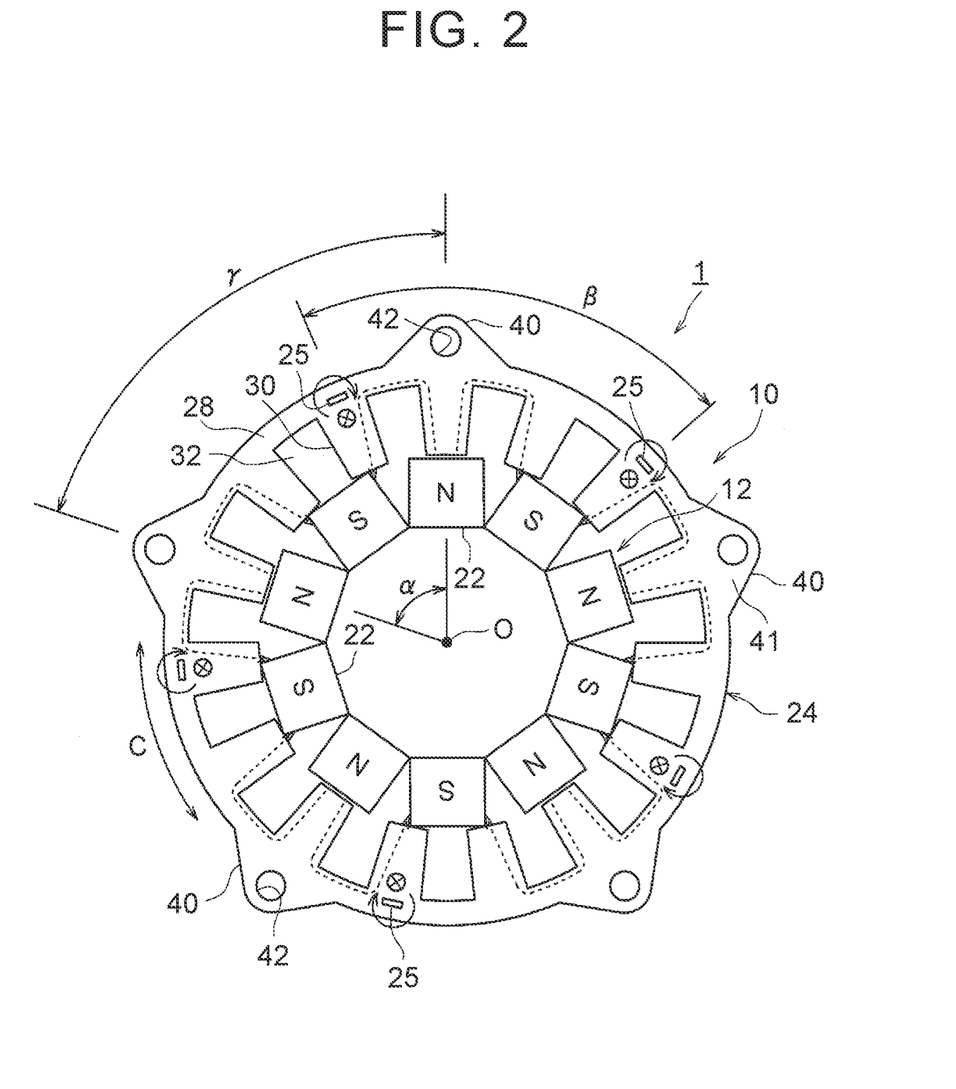
FIG. 2 is a schematic view of the stator of the first embodiment as viewed from an axial direction thereof.

FIG. 1 is a sectional view of a rotary electric machine including a stator 10 of the first embodiment of the present disclosure, as viewed along an axial direction of the rotary electric machine. FIG. 2 is a schematic view of the stator 10 of the first embodiment as viewed from an axial direction thereof. In FIG. 1, an axial direction along a rotor rotational center O is indicated by an arrow E, and a radial direction vertical to the rotor rotational center O is indicated by an arrow R. In FIG. 2, a circumferential direction along a circle described on a plan vertical to the rotor rotational center O is indicated by an arrow C. In FIG. 2, a stator coil and a rotor core are not illustrated in the drawing.

As shown in FIG. 1, the rotary electric machine 1 includes the stator 10 and a rotor 12. The rotary electric machine 1 is housed in a case 2. One axial end of the case 2 is closed by a bottom portion 2a, and the other axial end thereof is opened. The opening of the case 2 is closed by a cover member 3.

As shown in FIG. 1 and FIG. 2, the rotor 12 includes a rotor core 14. The rotor core 14 is configured by stacking, in an axial direction, electromagnetic steel plates 16, each of which is punched into a disk shape by a press, for example. The respective electromagnetic steel plates 16 configuring the rotor core 14 are coupled with one another into an integrated body by a method of clamping, welding, or the like, for example.

A rotor shaft 18 is fixed through a center of the rotor core 14 in the axial direction. The rotor core 14 may be fixed to the rotor shaft 18 by a method of clamping, thermal insertion, nut fastening, or the like. One axial end of the rotor shaft 18 is rotatably supported by a bearing member 20a fixed to the bottom portion 2a of the case 2. The other axial end side of the rotor shaft 18 is rotatably supported by a bearing member 20b fixed to the cover member 3. Through this configuration, the rotor 12 is supported by the bearing members 20a, 20b such that the rotor 12 is rotatable along the inner circumference of the stator 10 in a cylindrical shape fixed to the case 2. The other axial end of the rotor shaft 18 is provided with a gear (not shown) used for inputting and outputting a motive power relative to the rotary electric machine 1.

The rotor 12 includes a plurality of permanent magnets 22 on an outer circumferential surface of the rotor core 14 in a substantially cylindrical shape. The radially outer portions of the permanent magnets 22 are magnetized to N-poles and S-poles, alternately. The magnetic poles of the rotor 12 are configured by the respective permanent magnets 22. The permanent magnets 22 are fixedly arranged with equal pitches in the circumferential direction of the rotor core 14. Specifically, each two circumferentially adjacent permanent magnets 22 are disposed at positions where a central angle relative to the rotor rotational center O of the rotor 12 becomes $\alpha/2(°)$. The permanent magnetic poles 22 configure the respective magnetic poles in the rotor 12. The permanent magnets 22 are appropriately referred to as magnetic poles 22, hereinafter.

In the present embodiment, the rotor 12 includes ten magnetic poles 22, for example. Hence, in the present embodiment, the central angle $\alpha/2$ defined by each circumferentially adjacent magnetic poles 22 relative to the rotor rotational center O is set to be 36°, and a central angle $\alpha$ defined by each two circumferentially adjacent magnetic poles of the same poles (e.g., N-poles) is set to be 72°. This central angle $\alpha$ may be deemed as a central angle defined by a double pole pitch.

In the present embodiment, it is described that a single magnetic pole is configured by a single permanent magnet, but a single magnetic pole may be configured by a plurality of permanent magnets. The permanent magnets configuring the magnetic poles may be embedded in a vicinity of the outer circumferential surface of the rotor core 14.

The stator 10 of the present embodiment will be described, hereinafter. With reference to FIG. 1 and FIG. 2, the stator 10 includes a stator core 24 and a stator coil 26. The stator core 24 is formed by stacking, in an axial direction, electromagnetic steel plates 27, each punched into an annular disk shape by a press, for example, and coupling the electromagnetic steel plates 27 with one another by a plurality of clamping portions (coupling portions) 25 into an integral body.

The stator core 24 includes a yoke 28 in an annular disk shape, and a plurality of teeth 30 circumferentially arranged with equal intervals in a manner as to project radially inward from an inner circumferential edge of the yoke 28. A groove-shaped slot 32 extending through the stator core 24 in the axial direction is formed between each two circumferentially adjacent teeth 30. In the present embodiment, it is exemplified that 15 teeth 30 and 15 slots 32 are respectively formed. Accordingly, in the present embodiment, every pitch of the teeth 30 and of the slots 32 is set to be 24°.

The stator coil 26 is configured by winding an insulated copper wire around the teeth 30, for example. The stator coil 26 includes a portion 26a located inside each slot 32, and a coil end portion 26b projecting toward both axial sides of the stator core 24. In the present embodiment, the stator coil 26 is wound around each tooth 30 in a concentrated winding method. Specifically, a single coil piece is wound around a single tooth 30, and the coil pieces are electrically connected via a bus bar or the like, thereby forming the stator coil 26.

The rotary electric machine 1 is a three-phase synchronous motor, for example. In this case, the stator coil 26 is configured by a U-phase coil, a V-phase coil, and a W-phase coil. Specifically, in the stator 10 of the present embodiment, five U-phase coil pieces configuring the U-phase coil are wound around the teeth 30 at every third position, five V-phase coil pieces configuring the V-phase coil are wound around the teeth 30 circumferentially adjacent to the U-phase coil pieces, and five W-phase coil pieces configuring the W-phase coil are wound around the rest of the teeth 30, respectively.

As aforementioned, the electromagnetic steel plates 27 configuring the stator core 24 are coupled with one another by the clamping portions 25 formed in the yoke 28. Each clamping portion 25 is a recessed portion formed into a recess shape on one surface of each electromagnetic steel plate 27 and into a projecting shape on the other surface of this electromagnetic steel plate 27, and the electromagnetic steel plates are coupled with one another by the clamping portions 25 through a male-female fitting thereof. In addition, the respective electromagnetic steel plates 27 are linearly welded along the axial direction in part of the outer circumferential surfaces of the electromagnetic steel plates 27 so as to be firmly coupled with each other.

The plurality of clamping portions 25 are arranged on the yoke 28 of the stator core 24 with equal pitches in the circumferential direction. Specifically, in the stator 10 of the present embodiment, five clamping portions 25 are formed with pitches $\beta$, each of which is 360°/5=72°. In the present embodiment, each pitch $\beta$ between the clamping portions 25 is set to be an integral multiple (i.e., ×1) of the central angle $\alpha=72°$ defined by each two circumferentially adjacent magnetic poles 22 of the same pole in the rotor 12. As another example, if the central angle $\alpha$ defined by each two circumferentially adjacent magnetic poles of the same pole in the rotor 12 is 36° (the number of magnetic poles is 20) for example, each pitch $\beta$ between the clamping portions 25 may be set to be twice as great as the above central angle $\alpha$ (i.e., 2×36°=72°). As further another example, if the central angle $\alpha$ defined by each two circumferentially adjacent magnetic poles of the same pole in the rotor 12 is 24° (the number of magnetic poles is 30) for example, each pitch $\beta$ between the clamping portions 25 may be set to be three times as great as the above central angle $\alpha$ (i.e., 3×24°=72°). The pitch denotes a term indicating an interval between each two adjacent objects among a plurality of objects (such as the permanent magnets 22, the clamping portions 25, and fixing portions 40 described later) circumferentially arranged. The pitch is represented by an angle defined by each two adjacent objects relative to the rotor rotational center O of the rotor 12.

As shown in FIG. 2, it is preferable to form the clamping portions 25 at positions circumferentially displaced from the fixing portions 40 described later. In other words, it is preferable to set the clamping portions 25 not to be circumferentially aligned to the fixing portions 40. Accordingly, when the clamping portion 25 is subjected to intrusion-formation by a press, it is possible to prevent occurrence of distortion in a through-hole 42 of each fixing portion 40.

The stator core 24 has the fixing portions 40 projecting radially outward from the outer circumferential surface in a cylindrical shape of the stator core 24. Each fixing portion 40 is formed in a substantially triangular shape having a round apex as viewed in the axial direction. The through-hole 42 is formed in each fixing portion 40 in a manner as to extend through the fixing portion 40 in the axial direction. The fixing portions 40 including the through-holes 42 are formed by stacking, in the axial direction, fixing-portion margins 41 in a substantially triangular shape formed in each electromagnetic steel plate 27. As shown in FIG. 1, a fastening member 44 such as a bolt is inserted into the through-hole 42 of each fixing portion 40 from one axial side of the fixing portion 40, and a front end of the fastening member 44 such as the bolt projecting toward the other axial end is screwed into a female screw hole 4 formed in the bottom portion 2a of the case 2. Through this configuration, the stator 10 is fasteningly fixed to the case 2.

The plurality of fixing portions 40 of the stator core 24 are arranged with equal pitches in the circumferential direction of the stator core 24. In the present embodiment, it is exemplified that five fixing portions 40 are formed. In this case, each pitch γ between the fixing portions 40 is set to be 360°/5=72°, as with the case of the clamping portions 25.

As with the present embodiment, if the number of the clamping portions 25 provided with equal pitches in the circumferential direction is an odd number, each pitch γ between the fixing portions 40 is set to be a divisor of each pitch β between the clamping portions 25 relative to the rotor rotational center O. This means that if n(=1,2,3 . . . ) is an integer, the pitch γ can be represented by γ=β/n. Specifically, in the case of the present embodiment, each pitch γ between the fixing portions 40 is set to be equal to each pitch β between the clamping portions 25, which corresponds to n=1. The pitch γ is not limited to this case, and if n=2 is set, the pitch γ may be set to be half of each pitch between the clamping portions 25 so that the number of the fixing portions 40 may be twice (e.g., 10) as many as that of the clamping portions 25, or if n=3 is set, each pitch γ between the fixing portions 40 may be set to be one third of each pitch between the clamping portions 25 so that the number of the fixing portions 40 may be three times (e.g., 15) as many as that of the clamping portions 25.

Alternatively, if the number of the clamping portions 25 is an odd number such as three, for example, each pitch γ between the fixing portions 40 may be set to be the same as each pitch β between the clamping portions 25 relative to the rotor rotational center O. This means that γ=β is satisfied, and the present embodiment corresponds to this case.

Operation of the stator 10 of the rotary electric machine 1 having the aforementioned configuration will be described, hereinafter.

As indicated by a dotted line in FIG. 2, a magnetic flux emitting from each magnetic pole 22 of the N-pole of the rotor 12 passes from the front end of the corresponding tooth 30 of the stator 10 through the vicinity of the inner circumferential edge of the yoke 28, and then flows from another circumferentially adjacent tooth 30 into the corresponding magnetic pole 22 of the S-pole of the rotor 12.

Each electromagnetic steel plate 27 configuring the stator core 24 has an insulation coating or an insulation film on both back and front surfaces thereof so as to prevent the axially adjacent electromagnetic steel plates from being electrically conducted to each other. This prevents each electromagnetic steel plate 27 from forming a closed-loop current path thereinside. Accordingly, if the stator 10 is combined with the rotor 12 to operate as the rotary electric machine 1, it is possible to suppress an eddy current loss generated by variation of interlinkage flux during the rotor rotation.

However, as with the stator 10 of the present embodiment, if the electromagnetic steel plates are coupled with one another by the clamping portions 25 through the male-female fitting, insulation coating or the like on the front and back surfaces of the plates might to be removed at the time of press-forming the clamping portions 25. In such a case, the plurality of electromagnetic steel plates 27 stacked in the axial direction are electrically conducted to one another through the clamping portions 25, the yoke 28 located between each two circumferentially adjacent clamping portions 25 and these two clamping portions 25 form a closed-loop current path; consequently, the eddy current loss might be increased when the stator 10 operates as the rotary electric machine 1.

To counter this problem, in the stator 10 of the present embodiment, each pitch β between the clamping portions 25 is set to be an integral multiple of the central angle α defined by the two magnetic poles 22 of the same pole of the rotor 12 relative to the rotor rotational center O. Accordingly, as shown in FIG. 2, variation of interlinkage magnetic flux, as indicated by an arrow of a solid line in a clockwise direction, is generated around each clamping portion 25 by the magnetic flux as indicated by the dotted line in the stator core 24. As a result, according to the corkscrew rule, an electromotive force to flow the current from the frontward side toward the backward side of the drawing in FIG. 2 is generated in each clamping portion 25, as indicated by a "(x)" mark. This is the same in every clamping portion 25. Specifically, in the stator 10 of the present embodiment, the clamping portions 25 are formed with pitches, each equivalent to the central angle defined by the two magnetic poles 22 of the same pole, and thus the electromotive force to flow the current in the identical direction is generated in every clamping portion 25. Even if the positions of the magnetic poles 22 relative to the stator 10 are changed when the rotor 12 rotates, the magnetic flux distributions across the yoke 28 of the stator core 24 located between each adjacent clamping portions 25 become the same; therefore, the current flow direction generated in each clamping portion 25 becomes the same: either a direction from the frontward side to the backward side or a direction from the backward side to the frontward side. Hence, even if the magnetic fluxes from the magnetic poles 22 of the rotor 12 are interlinked in the closed-loop current path through the plurality of electromagnetic steel plates via the clamping portions 25, it is possible to hinder the eddy current from flowing in the great closed-loop current path via the clamping portions 25. Accordingly, it is possible to suppress generation of the eddy current loss in the stator 10.

In the stator 10 of the present embodiment, since each pitch γ between the fixing portions 40 is set to be 1/integer of each pitch β between the clamping portions 25, or identical to the pitch β, the electromagnetic steel plates are rotationally built-up one by one or per a predetermined number of the plates at a predetermined angle (e.g., 72°) in the same circumferential direction, thereby configuring the fixing portions 40 with the fixing-portion margins 41 of the electromagnetic steel plates 27 aligned in the axial direction. The predetermined angle for the rotational build-up of the electromagnetic steel plates 27 may be set to be a greater angle of either the angle defined by the pitch γ or the angle defined by the pitch β, or an integral multiple of this greater angle. In this manner, the stator core 24 can be configured by rotationally building up the electromagnetic steel plates 27, and the stacking thickness L of the stator core 24 can be uniform across the circumferential direction, thereby securing the geometrical tolerance (straightness, squareness, etc.) of the stator core 24.

Figure 3:
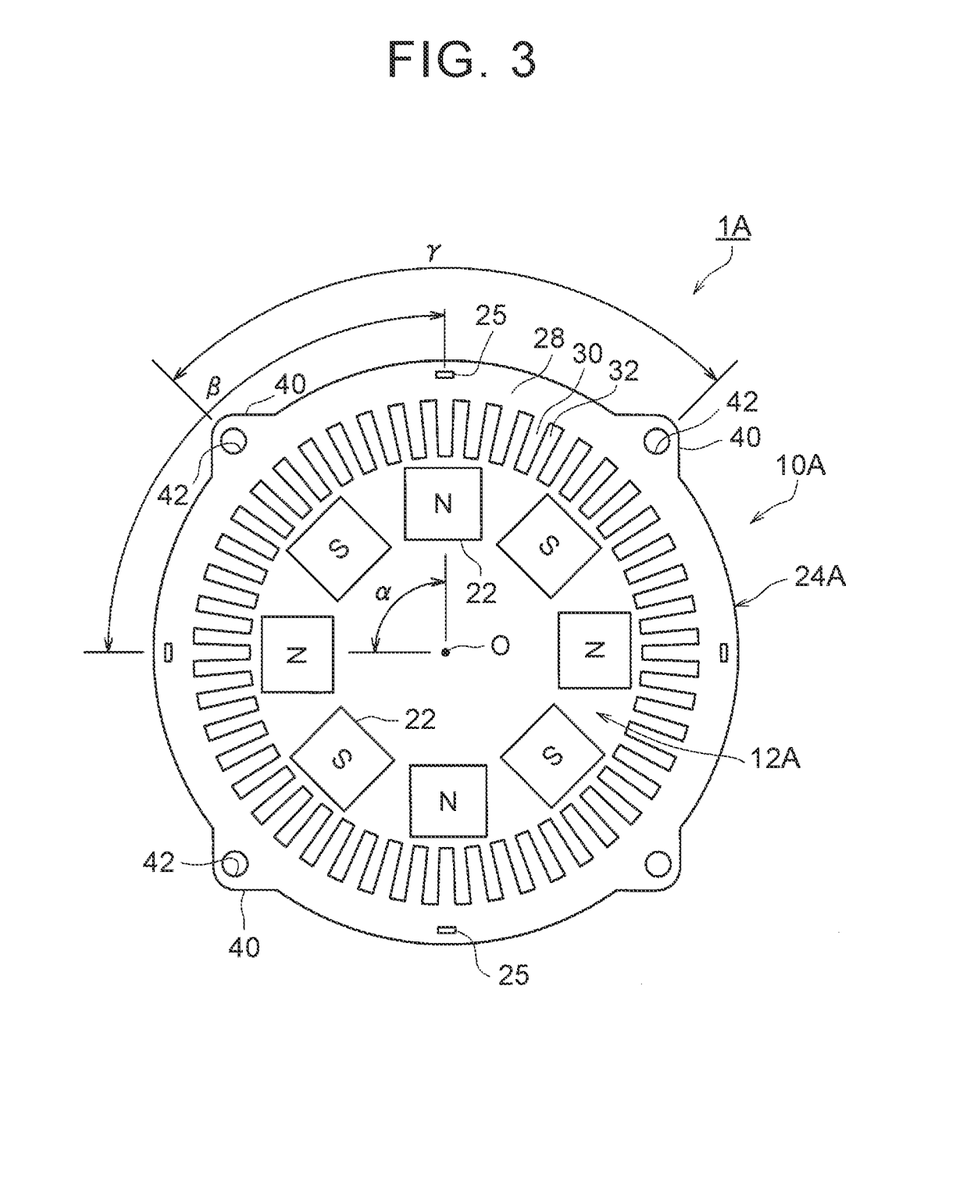
FIG. 3 is a schematic view of a stator of a second embodiment as viewed from an axial direction thereof.

Hereinafter, a stator 10A of the second embodiment will be described with reference to FIG. 3. FIG. 3 is a schematic view of the stator 10A of the second embodiment as viewed from the axial direction. In FIG. 3, illustrations of the rotor core 14 and the stator coil 26 are omitted. Hereinafter, the same or similar reference numerals are applied to common or similar elements to those in the stator 10 of the aforementioned first embodiment, and overlapping description thereof will be omitted.

As shown in FIG. 3, a rotary electric machine 1A including the stator 10A of the present embodiment includes the stator 10A and a rotor 12A. The rotor 12A is provided on its outer circumferential surface with a plurality of magnetic poles 22 arranged in the circumferential direction with equal pitches, for example. Specifically, the rotor 12A is provided with eight magnetic poles 22 with pitches each of which is 90°. The magnetic poles 22 are configured such that respective poles in the radially outer portions of the magnetic poles 22 are alternately magnetized to an N-pole and an S-pole. Hence, in the rotary electric machine 1A of the present embodiment, with respect to the magnetic poles 22 of the rotor 12A, the central angle α defined by each two circumferentially adjacent magnetic poles 22 of the same pole (e.g., N-poles) in the rotor 12A is set to be 45° relative to the rotor rotational center O.

The stator 10A of the present embodiment includes a stator core 24A and a stator coil 26 (see FIG. 1). The stator core 24A includes an annular yoke 28 and a plurality of teeth 30 projecting radially inward from an inner circumferential edge of the yoke 28, and a slot 32 is formed between each adjacent teeth 30.

In the stator 10A of the present embodiment, there are formed 48 teeth 30 and 48 slots 32, respectively. The stator coil 26 is wound around a plurality of teeth 30 with the concentrated winding method. In this case, among the 48 slots 32, 16 slots 32 at every third position are U-phase coil slots into which a U-phase coil is inserted, and 16 slots 32 circumferentially adjacent to these U-phase coil slots 32 are V-phase coil slots into which a V-phase coil is inserted, and the rest of 16 slots 32 are W-phase coil slots into which a W-phase coil is inserted.

The stator core 24A is formed by stacking the plurality of annular electromagnetic steel plates 27 in the axial direction. The respective electromagnetic steel plates 27 are coupled with one another into an integral body through the male-female fitting of the clamping portions 25 provided with the equal pitches β in the circumferential direction. In the stator 10A of the present embodiment, the number of the clamping portions 25 is set to be an even number. Specifically, it is exemplified that the stator core 24 has four clamping portions 25. This means that the pitch β between each two adjacent clamping portions 25 is set to be 90° which is the identical to the aforementioned central angle α.

The stator core 24A includes the fixing portions 40 projecting radially outward from the cylindrical outer circumferential surface of the stator core 24A. Each fixing portion 40 is provided with a through-hole 42 extending through the fixing portion 40 in the axial direction. A fastening member 44 such as a bolt is inserted into the through-hole 42 of each fixing portion 40 from one axial side of the fixing portion 40, and a front end of the fastening member 44 such as the bolt projecting toward the other axial end is screwed into the female screw hole 4 formed in the bottom portion 2a of the case 2, thereby fasteningly fixing the stator 10A to the case 2 (FIG. 1).

The plurality of fixing portions 40 of the stator core 24 are arranged with equal pitches in the circumferential direction of the stator core 24. In the present embodiment, it is exemplified that four fixing portions 40 are formed. In this case, the pitch γ between each two adjacent fixing portions 40 is set to be 90°, which is the same as that of the clamping portions 25.

As with the present embodiment, if the number of the clamping portions 25 provided with the equal pitches in the circumferential direction is an even number, each pitch γ between the fixing portions 40 may be set to be a divisor of each pitch β between the clamping portions 25 relative to the rotor rotational center O. This means that if n(=1,2,3 . . . ) is an integer, the pitch γ can be represented by γ=β/n. Specifically, in the case of the present embodiment, each pitch γ between the fixing portions 40 is set to be equal to each pitch β between the clamping portions 25, which corresponds to n=1. The pitch γ is not limited to this case, and if n=2 is set, the pitch γ may be set to be half of each pitch between the clamping portions 25 so that the number of the fixing portions 40 may be twice (e.g., 8) as many as that of the clamping portions 25; or if n=3 is set, each pitch between the fixing portions 40 may be set to be one third of each pitch between the clamping portions 25 so that the number of the fixing portions 40 may be three times (e.g., 12) as many as that of the clamping portions 25.

Alternatively, if the number of the clamping portions 25 is an even number, such as four, six, and eight, each pitch γ between the fixing portions 40 may be set to be a divisor of 180°. In this case, if n(=1,2,3 . . . ) is an integer, the pitch γ may be represented by γ=180°/n. For example, if n=1 is set, each pitch γ between the fixing portions 40 is set to be 180° so that the number of the fixing portions 40 is two; if n=2 is set, each pitch γ between the fixing portions 40 is set to be 90° so that the number of the fixing portions 40 is four; and if n=3 is set, each pitch γ between the fixing portions 40 is set to be 60° so that the number of the fixing portions 40 is six. If the number of the fixing portions 40 is six with the pitch γ=60°, the central angle α defined by each two circumferentially adjacent magnetic poles 22 of the same pole in the rotor 12A may be set to be 60° (i.e., the number of the magnetic poles is 12) for example, and each pitch β between the clamping portions 25 may be set to be 60° or 120°, for example. In order to fasteningly fix the stator 10A to the case 2 in a stable and secure manner, the number of the fixing portions 40 may be three or more.

Operation of the stator 10A of the present embodiment having the aforementioned configuration will be described, hereinafter. In the stator 10A, each pitch β between the clamping portions 25 is set to be an integral multiple of the central angle α defined by the two magnetic poles 22 of the same pole of the rotor 12 relative to the rotor rotational center O; therefore, as with the stator 10 of the first embodiment, it is possible to prevent the eddy current from flowing through the plurality of electromagnetic steel plates via the clamping portions 25, thus suppressing generation of the eddy current loss.

In the stator 10A of the present embodiment, each pitch γ between the fixing portions 40 is set to be a divisor of each pitch β between the clamping portions 25 or a divisor of 180°, and thus the stator core 24A may be configured by rotationally building up the electromagnetic steel plates. Accordingly, the stacking thickness L of the stator core 24A can be uniform across the circumferential direction, thereby securing the geometrical tolerance (straightness, squareness, etc.) of the stator core 24A.

The present disclosure is not limited to the aforementioned embodiments and variations thereof, and various improvements and modifications may be made within the range of the matters recited in claims and equivalence to the claims.

For example, in the above description, it has been exemplified that the coupling portions are configured to couple the electromagnetic steel plates with one another through the male-female fitted clamping portions 25, but the present disclosure is not limited to this. The coupling portions may be configured to couple the electromagnetic steel plates with one another by inserting or pressingly inserting a long member, such as a pipe, a solid bar, a rivet, and a platy member, into each through-hole formed in the respective electromagnetic steel plates.

The present embodiment is summarized herein. The stator of the rotary electric machine includes: the stator core 24 configured by the stacked annular electromagnetic steel plates; and the stator coil 26. The electromagnetic steel plates configuring the stator core 24 are coupled with one another by the plurality of clamping portions 25 arranged with equal intervals in the circumferential direction. Each clamping portion 25 is formed with a pitch of an integral multiple of the central angle α defined by the two circumferentially adjacent magnetic poles 22 of the same pole in the rotor 12 relative to the rotor rotational center O. The stator core 24 includes the plurality of fixing portions 40, each projecting from the outer circumferential surface and having the through-hole 42, with equal pitches in the circumferential direction. The number of the clamping portions 25 is an odd number, and each fixing portion 40 is formed with the identical pitch to the pitch of each clamping portion 25, or with a pitch corresponding to a divisor of the pitch of each clamping portion 25 relative to the rotor rotational center O.

What is claimed is:

1. A stator of a rotary electric machine, the rotary electric machine comprising a rotor, the rotor comprising a plurality of magnetic poles, the stator comprising:
    a stator core defining an axial direction and a circumferential direction, the stator core comprising:
        a plurality of stacked annular electromagnetic steel plates, each of the annular electromagnetic steel plates comprising a plurality of coupling portions such that the annular electromagnetic steel plates are coupled with one another by the coupling portions, the coupling portions arranged with equal pitches in the circumferential direction, each of the coupling portions arranged with a pitch of an integral multiple of a central angle, the central angle being defined as an angle between two circumferentially adjacent magnetic poles of the same polarity from among the magnetic poles relative to a rotational center of the rotor, and
        a plurality of fixing portions projecting radially outward from an outer circumferential surface of the stator core, each of the fixing portions comprising a through-hole extending therethrough in the axial direction, the fixing portions arranged with equal pitches in the circumferential direction, a quantity of the coupling portions being an odd number, each of the fixing portions arranged with either the same pitch as the pitch of each of the coupling portions, or with a pitch corresponding to a divisor of the pitch of each of the coupling portions relative to the rotational center of the rotor; and
    a coil wound around teeth of the stator core.

2. The stator according to claim 1, wherein the coupling portions are arranged at positions displaced from the fixing portions in the circumferential direction.

3. A stator of a rotary electric machine, the rotary electric machine comprising a rotor, the rotor comprising a plurality of magnetic poles, the stator comprising:
    a stator core defining an axial direction and a circumferential direction, the stator core comprising:
        a plurality of stacked annular electromagnetic steel plates, each of the annular electromagnetic steel plates comprising a plurality of coupling portions such that the annular electromagnetic steel plates are coupled with one another by the coupling portions, the coupling portions arranged with equal pitches in the circumferential direction, each of the coupling portions arranged with a pitch of an integral multiple of a central angle, the central angle being defined as an angle between two circumferentially adjacent magnetic poles of the same polarity from among magnetic poles relative to a rotational center of the rotor, and
        a plurality of fixing portions projecting radially outward from an outer circumferential surface of the stator core, each of the fixing portions comprising a through-hole extending therethrough in the axial direction, the fixing portions arranged with equal pitches in the circumferential direction, a quantity of the coupling portions being an even number, each of the fixing portions arranged with a pitch corresponding to either a divisor of the pitch of each of the coupling portions relative to the rotational center of the rotor, or a divisor of 180°; and
    a coil wound around teeth of the stator core.

4. The stator according to claim 3, wherein the coupling portions are arranged at positions displaced from the fixing portions in the circumferential direction.

5. A rotary electric machine comprising:
    a rotor comprising a plurality of magnetic poles; and
    a stator, the stator comprising:
        a stator core defining an axial direction and a circumferential direction, the stator core comprising:
            a plurality of stacked annular electromagnetic steel plates, each of the annular electromagnetic steel plates comprising a plurality of coupling portions such that the annular electromagnetic steel plates are coupled with one another by the coupling portions, the coupling portions arranged with equal pitches in the circumferential direction, each of the coupling portions arranged with a pitch of an integral multiple of a central angle, the central angle being defined as an angle between two circumferentially adjacent magnetic poles of the same polarity from among the magnetic poles relative to a rotational center of the rotor, a quantity of the coupling portions being an odd number, and a plurality of fixing portions projecting radially outward from an outer circumferential surface of the stator core, each of the fixing portions comprising a through-hole extending therethrough in the axial direction, the fixing portions arranged with equal pitches in the circumferential direction, each of the fixing portions arranged with either the same pitch as the pitch of each of the coupling portions, or with a pitch corresponding to a divisor of the pitch of each of the coupling portions relative to the rotational center of the rotor; and a coil wound around teeth of the stator core.

6. The rotary electric machine according to claim 5, wherein the coupling portions are arranged at positions displaced from the fixing portions in the circumferential direction.

7. A rotary electric machine comprising:
a rotor comprising a plurality of magnetic poles; and
a stator, the stator comprising:
a stator core defining an axial direction and a circumferential direction, the stator core comprising:
a plurality of stacked annular electromagnetic steel plates, each of the annular electromagnetic steel plates comprising a plurality of coupling portions such that the annular electromagnetic steel plates are coupled with one another by the coupling portions, the coupling portions arranged with equal pitches in the circumferential direction, each of the coupling portions arranged with a pitch of an integral multiple of a central angle, the central angle being defined as an angle between two circumferentially adjacent magnetic poles of the same polarity from among the magnetic poles relative to a rotational center of the rotor, and a plurality of fixing portions projecting radially outward from an outer circumferential surface of the stator core, each of the fixing portions comprising a through-hole extending therethrough in the axial direction, the fixing portions arranged with equal pitches in the circumferential direction, a quantity of the coupling portions being an even number, each of the fixing portions arranged with a pitch corresponding to either a divisor of the pitch of each of the coupling portions relative to the rotor rotational center, or a divisor of 180°; and a coil wound around teeth of the stator core.

8. The rotary electric machine according to claim 7, wherein the coupling portions are arranged at positions displaced from the fixing portions in the circumferential direction.

9. The stator according to claim 1, wherein each of the coupling portions comprise:
a recessed portion formed on a first surface of each of the annular electromagnetic steel plates, and
a corresponding projecting portion formed on a second surface of each of the annular electromagnetic steel plates.

10. The stator according to claim 9, wherein, for each of the annular electromagnetic steel plates:
an insulating coating is provided on the first and second surfaces thereof, and
at least one of the coupling portions is not provided with the insulating coating.

11. The stator according to claim 3, wherein each of the coupling portions comprise:
a recessed portion formed on a first surface of each of the annular electromagnetic steel plates, and
a corresponding projecting portion formed on a second surface of each of the annular electromagnetic steel plates.

12. The stator according to claim 11, wherein, for each of the annular electromagnetic steel plates:
an insulating coating is provided on the first and second surfaces thereof, and
at least one of the coupling portions is not provided with the insulating coating.

13. The rotary electric machine according to claim 5, wherein each of the coupling portions comprise:
a recessed portion formed on a first surface of each of the annular electromagnetic steel plates, and
a corresponding projecting portion formed on a second surface of each of the annular electromagnetic steel plates.

14. The rotary electric machine according to claim 13, wherein, for each of the annular electromagnetic steel plates:
an insulating coating is provided on the first and second surfaces thereof, and
at least one of the coupling portions is not provided with the insulating coating.

15. The rotary electric machine according to claim 7, wherein each of the coupling portions comprise:
a recessed portion formed on a first surface of each of the annular electromagnetic steel plates, and
a corresponding projecting portion formed on a second surface of each of the annular electromagnetic steel plates.

16. The rotary electric machine according to claim 7, wherein, for each of the annular electromagnetic steel plates:
an insulating coating is provided on the first and second surfaces thereof, and
at least one of the coupling portions is not provided with the insulating coating.

* * * * *